(12) United States Patent
Weng

(10) Patent No.: US 12,334,971 B2
(45) Date of Patent: Jun. 17, 2025

(54) MOBILE PHONE PROTECTIVE HOUSING

(71) Applicant: SHENZHEN GUANGYIPENG TECHNOLOGY CO., LTD., Shenzhen (CN)

(72) Inventor: Jie Weng, Shenzhen (CN)

(73) Assignee: SHENZHEN GUANGYIPENG TECHNOLOGY CO., LTD., Shenzhen (CN)

( * ) Notice: Subject to any disclaimer, the term of this patent is extended or adjusted under 35 U.S.C. 154(b) by 470 days.

(21) Appl. No.: 17/720,311

(22) Filed: Apr. 14, 2022

(65) Prior Publication Data

US 2023/0223976 A1   Jul. 13, 2023

(30) Foreign Application Priority Data

Jan. 7, 2022   (CN) .......................... 202210018570.8

(51) Int. Cl.
| | | |
|---|---|---|
| *H04M 1/18* | (2006.01) | |
| *H04B 1/3877* | (2015.01) | |
| *H04B 1/3888* | (2015.01) | |
| *H04M 1/04* | (2006.01) | |

(52) U.S. Cl.
CPC ......... *H04B 1/3888* (2013.01); *H04B 1/3877* (2013.01); *H04M 1/04* (2013.01); *H04M 1/18* (2013.01)

(58) Field of Classification Search
CPC ... H04B 1/3888; H04B 1/3877; H04M 1/185; H04M 1/04
See application file for complete search history.

(56) References Cited

U.S. PATENT DOCUMENTS

| | | | | |
|---|---|---|---|---|
| 10,836,325 | B1 * | 11/2020 | Seko ................... | B60R 11/0241 |
| 11,658,694 | B1 † | 5/2023 | Wang | |
| 2021/0119660 | A1 * | 4/2021 | Yu ......................... | H04M 1/185 |
| 2022/0029654 | A1 * | 1/2022 | King ................... | A45C 13/005 |

FOREIGN PATENT DOCUMENTS

CN           214851387 U   † 11/2021

\* cited by examiner
† cited by third party

*Primary Examiner* — Charles N Appiah
*Assistant Examiner* — Nikita H Patel

(57) ABSTRACT

A mobile phone protective housing includes a housing body and a stand. The housing body includes a bottom wall and a side wall extending from a circumference of the bottom wall. The side wall and the bottom wall define an accommodating chamber for accommodating a mobile phone. The stand is rotatably connected to a back surface of the bottom wall, wherein the stand is foldable and unfoldable relative to the housing body, and wherein the stand includes a magnetic member.

17 Claims, 10 Drawing Sheets

MOBILE PHONE PROTECTIVE HOUSING

CROSS REFERENCE OF RELATED APPLICATIONS

The present application claims priority of Chinese Patent Application No. 202210018570.8, filed on Jan. 7, 2022, the entire contents of which are hereby incorporated by reference.

TECHNICAL FIELD

The present disclosure belongs to the technical field of mobile phone accessories, and more particularly to a mobile phone protective housing.

BACKGROUND

With the development of smart phones, people use mobile phones more and more frequently, and the functions of the mobile phones are getting more and more powerful. Many of the mobile phones have wireless charging function. However, when the mobile phones covered with mobile phone protective housings are being wirelessly charged, the charging speed the charging efficiency are relatively low. Especially, when the mobile phone protective housings have stands, the wireless charging efficiency of the mobile phone s are greatly reduced. As a result, it is necessary to take the mobile phones out of the mobile phone protective housings for wirelessly charging, which brings the inconvenience to users.

SUMMARY

An objective of an embodiment of the present disclosure is to provide a mobile phone protective housing which is convenient for wireless charging a mobile phone received therein.

A mobile phone protective housing includes a housing body and a stand. The housing body includes a bottom wall and a side wall extending from a circumference of the bottom wall. The side wall and the bottom wall define an accommodating chamber for accommodating a mobile phone. The stand is rotatably connected to a back surface of the bottom wall, wherein the stand is foldable and unfoldable relative to the housing body, and wherein the stand includes a magnetic member.

Compared with the prior art, the mobile phone protective housing of the present disclosure combines the stand with the magnetic member, such that when the stand is rotatably folded, the mobile phone protective housing is tightly attracted to the mobile phone by the magnetic members in the stand, which may achieve high wireless charging efficiency; and since supporting and wireless charging functions are combined, the mobile phone protective housing is convenient to use and simple, light and thin in overall structure.

BRIEF DESCRIPTION OF THE DRAWINGS

In order to explain technical solutions of the present disclosure more clearly, accompanying drawings required to be used in describing the embodiments or the prior art will be briefly introduced below. Obviously, the accompanying drawings in the following description are only some embodiments of the present disclosure. For those ordinarily skilled in the art, other accompanying drawings may be obtained based on these accompanying drawings without any creative labor.

FIG. 4 is a perspective view of the mobile phone protective housing shown in FIG. 1 with a mobile phone mounted in;

DESCRIPTION OF THE EMBODIMENTS

Figure 1:
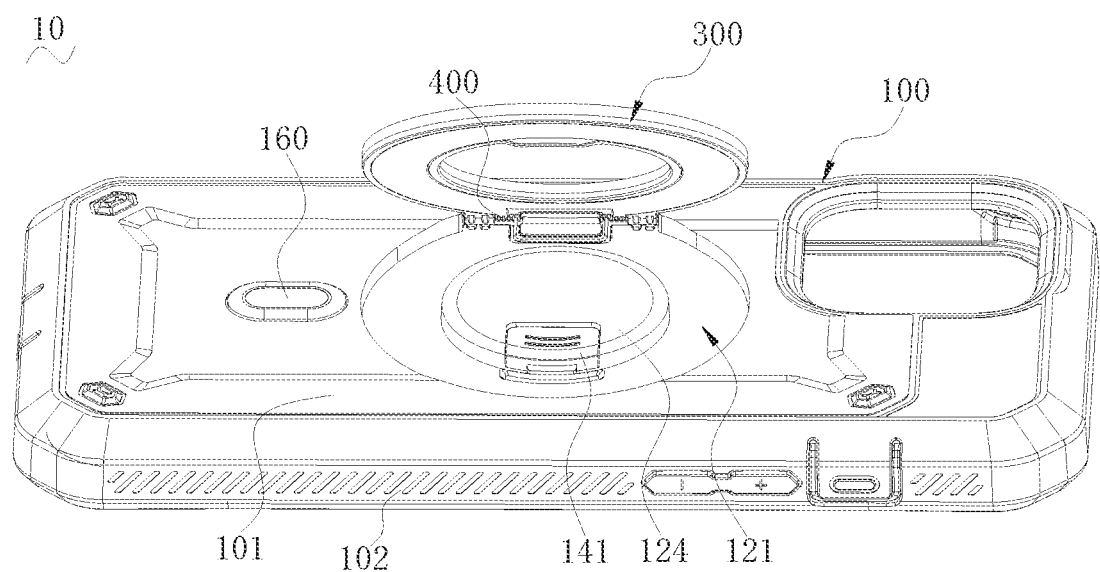
FIG. 1 is a perspective view of a mobile phone protective housing according to an embodiment of the present disclosure, wherein a stand thereof is in an unfolded state.
Figure 2:
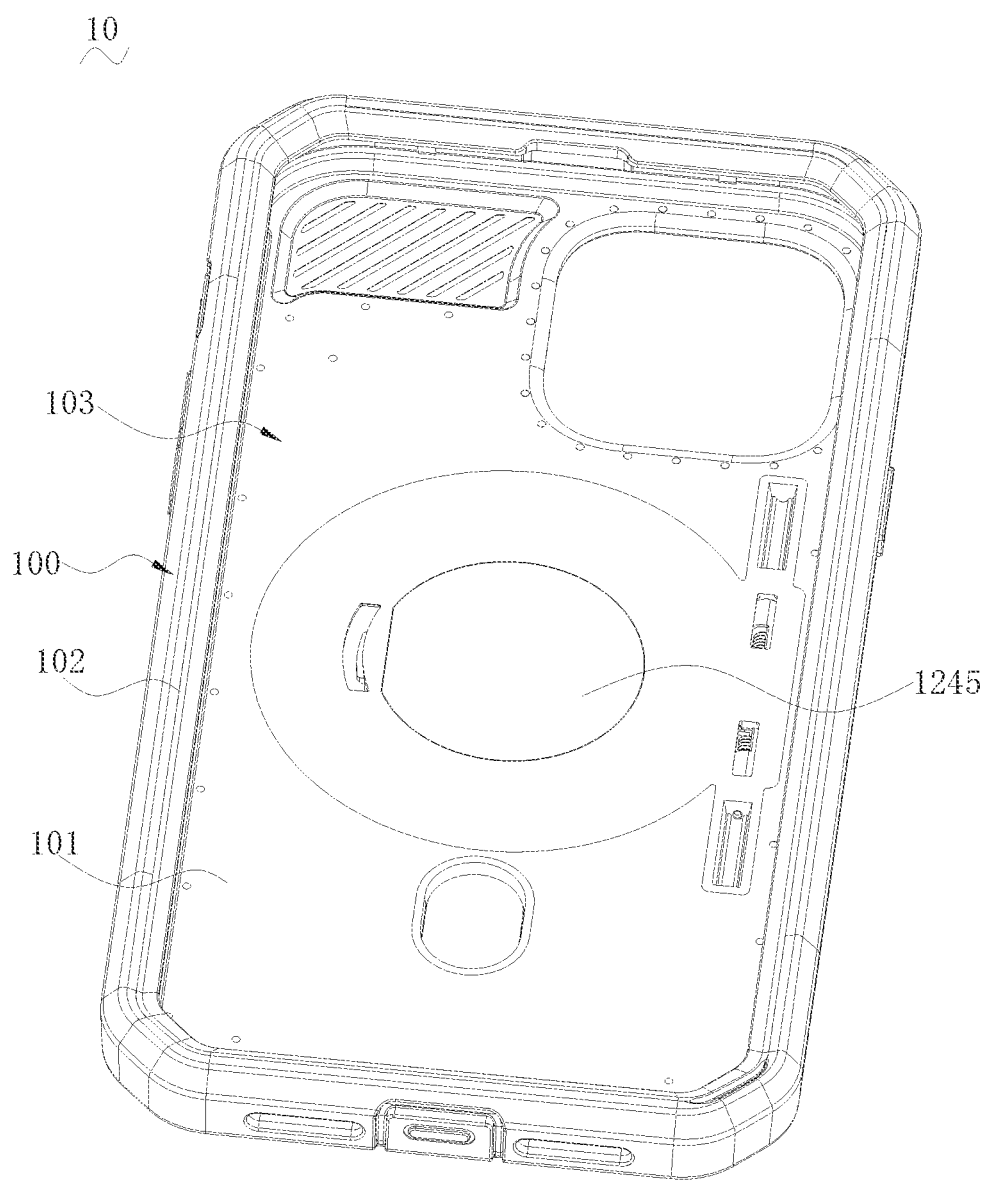
FIG. 2 is a perspective view of the mobile phone protective housing shown in FIG. 1, viewed from another angle.

In order to make technical problems, technical solutions and beneficial effects to be solved by the present disclosure clearer, the present disclosure will be further described in detail below with reference to accompanying drawings and embodiments. It should be understood that specific embodiments described herein are only intended to explain the present disclosure, not to limit the present disclosure.

It should be noted that when an element is referred to as being "fixed to" or "disposed on" another element, it may be directly or indirectly on the other element. When an element is referred to as being "connected to" another element, it may be directly or indirectly connected to the other element.

It should be understood that oriental or positional relationships indicated by terms "length", "width", "upper", "lower", "front", "rear", "left", "right", "vertical", "horizontal", "top", "bottom", "inner", "outer" and the like are only intended to facilitate the description of the present disclosure and simplify the description based on oriental or positional relationships shown in the accompanying drawings, not to indicate or imply that the apparatus or element referred must have a specific orientation, is constructed and operated in a specific orientation, and therefore cannot be understood as a limitation of the present disclosure.

In addition, terms "first" and "second" are only used for descriptive purposes, and cannot be understood as indicating or implying relative importance or implicitly indicating the number of technical features indicated. Therefore, features defined with "first" and "second" may explicitly or implicitly include one or more of these features. In the description of the present disclosure, "a plurality of" refers to two or more than two, unless otherwise particularly defined.

Reference is made to FIG. 1 to FIG. 4, a mobile phone protective housing 10 according to an embodiment of the present disclosure will be described. The mobile phone protective housing 10 includes a housing body 100 and a stand 300 rotatably connected to the housing body 100. The housing body 100 includes a bottom wall 101 and a side wall 102. The side wall 102 extends from a circumference of the bottom wall 101 and located at one side of the bottom wall. The side wall 102 and the bottom wall 101 cooperatively define an accommodating chamber 103 for accommodating a mobile phone 20.

Preferably, the side wall 102 of the housing body 100 is provided with a key operating portion, a sound transmitting hole and a data cable plug via. The bottom wall 101 of the housing body 100 is provided with a camera hole for exposing a camera of the mobile phone.

Figure 5:
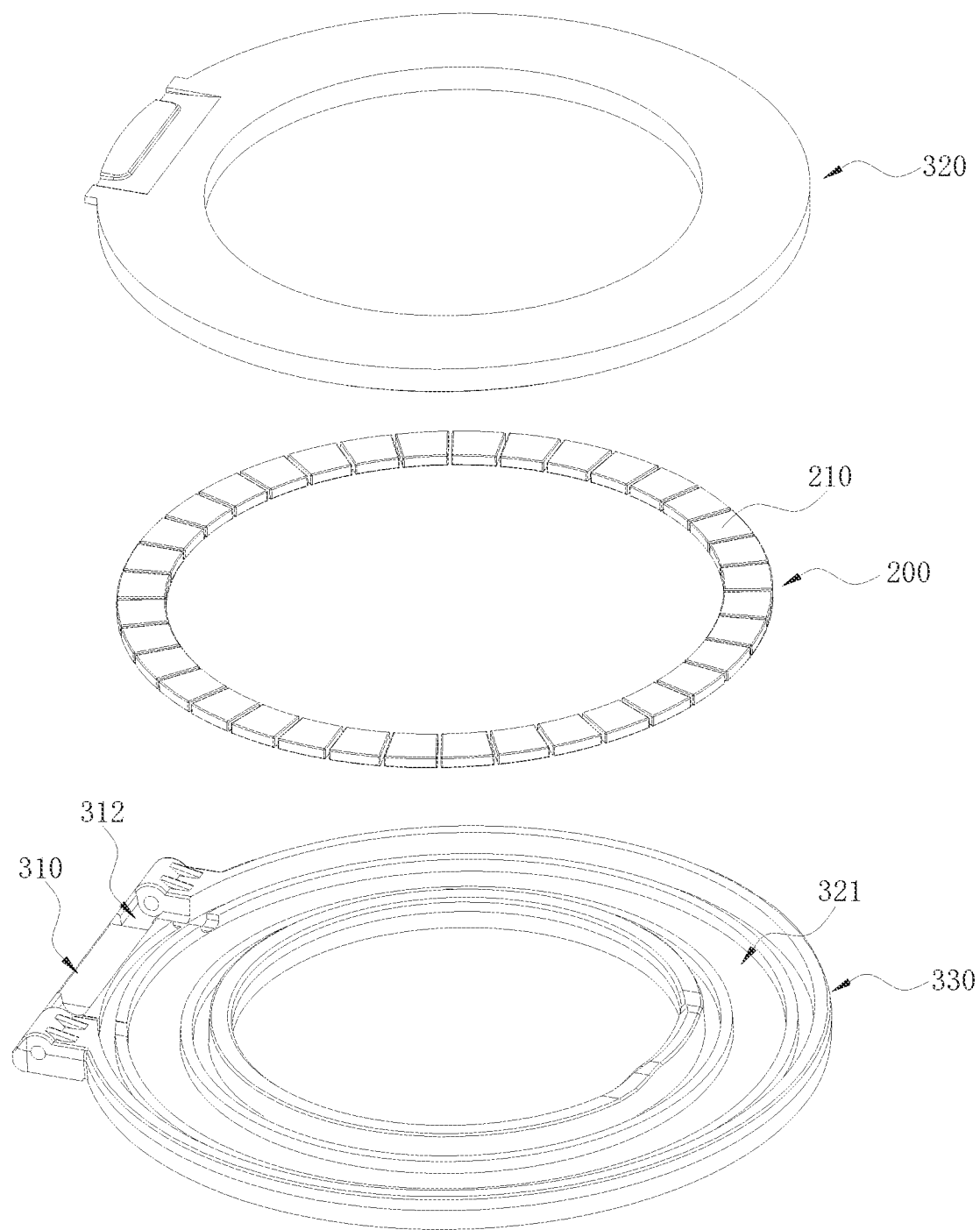
FIG. 5 is an exploded view of the stand of the mobile phone protective housing as shown in FIG. 1.

The stand 300 is rotatably connected to a back surface of the bottom wall 101. Referring also to FIG. 5. The stand 300 includes a magnetic member 200 therein, and the magnetic member 200 includes a plurality of magnetic units made of magnetic materials, such as permanent magnets or magnetic units made of silicon steel sheet. When the stand 300 is rotatably folded, the magnetic member 200 is aligned with and attracted to magnets within the mobile phone 20, such that the mobile phone protective housing 10 is more closely adsorbed to the mobile phone, and thus a gap between the bottom wall 101 of the mobile phone protective housing 10 and the back surface of the mobile phone is minimized. Accordingly, the wirelessly charging efficiency of the mobile phone can be increased.

Particularly, in this embodiment, the magnetic member 200 include a plurality of magnets 210 arranged within the stand 300 at intervals, and the plurality of magnets 210 are annularly distributed in a ring. The polarities of the magnets 210 at the sides facing the center of the ring are the same. The polarities of two opposite sides of two adjacent magnets 210 which are facing each other are the same. The polarities of the back sides of the magnets 210 are the same, and the polarities of the back sides of the magnets 210 are opposite to the polarities of the sides of the magnets of the mobile phone which face the bottom wall 101. In this way, the adsorption between the mobile phone protective housing 10 and the mobile phone can be achieved. The center of the ring where the plurality of magnets 210 locate coincides with the center of the stand 300.

An outer diameter of the ring defined by the plurality of magnets 210 is approximately equal to that of a circle of magnets of the mobile phone. The magnets within the stand 300 are in one-to-one attraction to the magnets within the mobile phone. The stand 300 includes a base plate 330 and a cover plate 320 connected to each other. The base plate 330 and the cover plate 320 are both annular. The base plate 330 is provided with an annular fixing groove 321, and the plurality of magnets 210 are embedded and fixed in the fixing groove 321 at even intervals. It should be understood that the magnetic member 200 may include ferromagnetic materials. In this way, the attraction between the mobile phone protective housing 10 and the mobile phone can also be achieved. The cover plate 320 is connected to the base plate 330 to close the fixing groove 321, thereby preventing movement of the magnets 210.

Preferably, in this embodiment, the back surface of the bottom wall 101 of the housing body 100 is recessed and defines a first groove 121 for accommodating the stand 300. Preferably, the first groove 121 has a shape and size corresponding to those of the stand 300. When the stand 300 is folded and received in the first groove 121, the mobile phone protective housing 10 is substantially flat at its back side and compact in overall structure. Alternatively, the first groove 121 may have a size greater than that of the stand 300, in that case, the stand 300 can also be accommodated in the first groove 121 after being folded.

Figure 3:
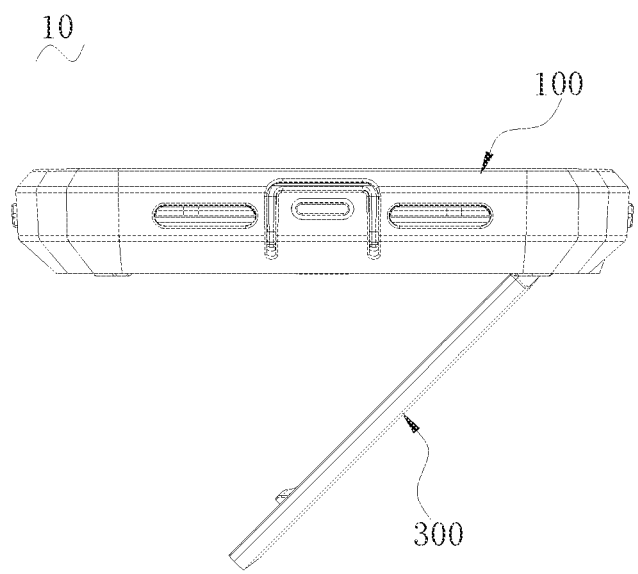
FIG. 3 is a side view of the mobile phone protective housing shown in FIG. 1.
Figure 4:
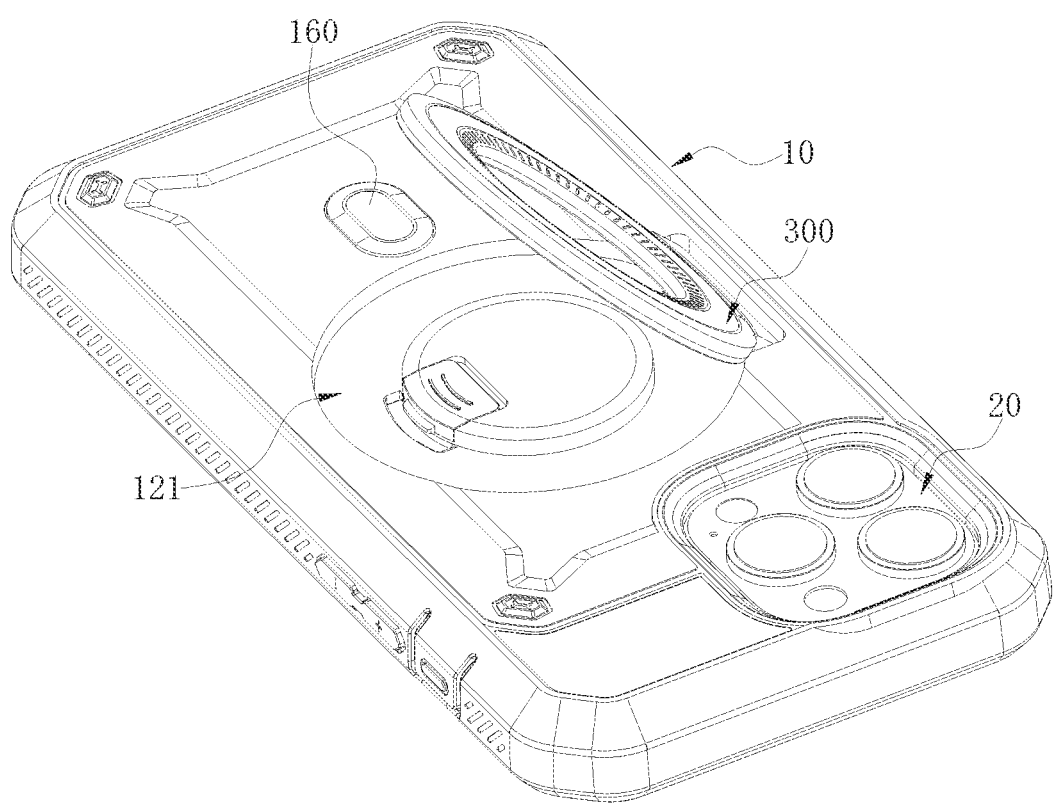

With reference to FIG. 1, FIG. 3 and FIG. 4, the stand 300 can be rotatably unfolded or folded relative to the housing body 100. The stand 300 may support the mobile phone 20 to be placed on a desk at multiple angles when being unfolded, which satisfies the multi-angle placement of the mobile phone 20 and is convenient for a user to use. With reference to FIG. 4 to FIG. 7, the stand 300 may be accommodated in the first groove 121 when being rotatably folded, such that the stand 300 is hidden in the housing body 100, and the stand 300 is closely clung to the bottom wall 101. When the mobile phone 20 covered with the mobile phone protective housing 10 is placed on a wireless charging device 30 (referring to FIG. 7), the bottom wall 101 of the mobile phone protective housing 10 is closely adsorbed to the wireless charging device 30. In this way, the distance between the mobile phone and the wireless charging device 30 can be minimized. By means of the magnetic member 200, the mobile phone 20 can be tightly absorbed to the wireless charging device 30, and as a result, the wireless charging efficiency of the mobile phone 20 can be ensured. The wireless charging device 30 in FIG. 7 may be integrated in a vehicle-mounted stand and thus the vehicle-mounted stand has a wireless charging function. When the stand 300 is folded and accommodated in the first groove 121, the mobile phone covered with the mobile phone protective housing 10 can be mounted on the vehicle-mounted stand with the wireless charging function, and the mobile phone protective housing 10 is adapted to being used in the vehicle-mounted stand for wireless charging.

Since the stand 300 can be folded and accommodated in the first groove 121 of the housing body 100, the mobile phone protective housing 10 can be attracted and closely clung to the mobile phone by the magnetic members 200 within the stand 300 to ensure the wireless charging efficiency. As such, high wireless charging efficiency may be achieved without taking the mobile phone 20 out of the mobile phone protective housing 10. The mobile phone protective housing 10 is simple, light and thin in overall structure, convenient to use and excellent in practicability by combining the supporting function of variable angles with the wireless charging function of the stand.

Compared with the prior art, the mobile phone protective housing 10 provided by the present disclosure combines the stand 300 having the magnetic member 200 with the housing body 100, such that when the stand 300 is folded, the mobile phone protective housing 10 is tightly adsorbed to the mobile phone by the magnetic members 200 in the stand 300, which can achieve high wireless charging efficiency. Since the mobile phone protective housing 10 has both the supporting function and the wireless charging function, the mobile phone protective housing 10 is convenient to use and is simple, light and thin in overall structure.

Figure 6:
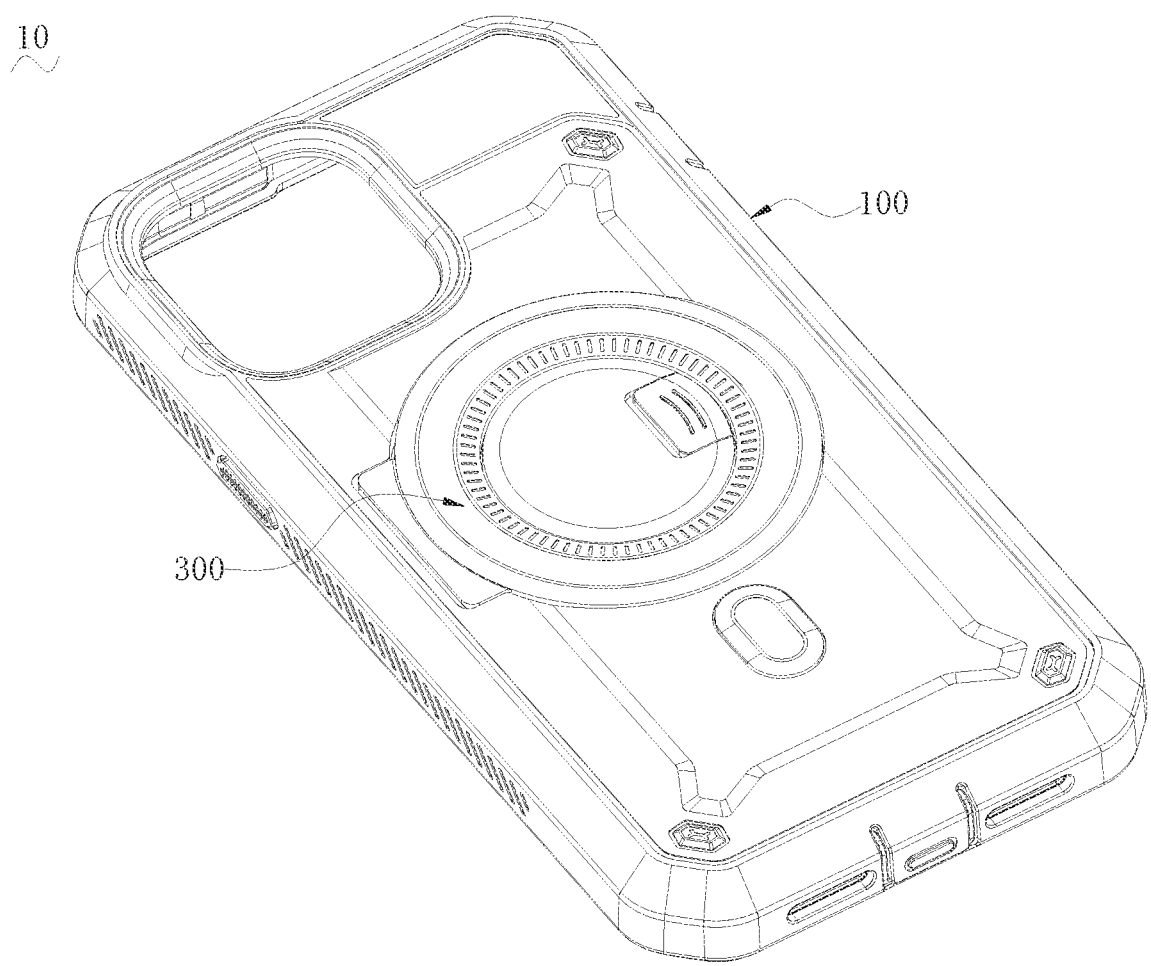
FIG. 6 is a perspective view of the stand of the mobile phone protective housing shown in FIG. 1, wherein the stand is in a folded state.
Figure 7:
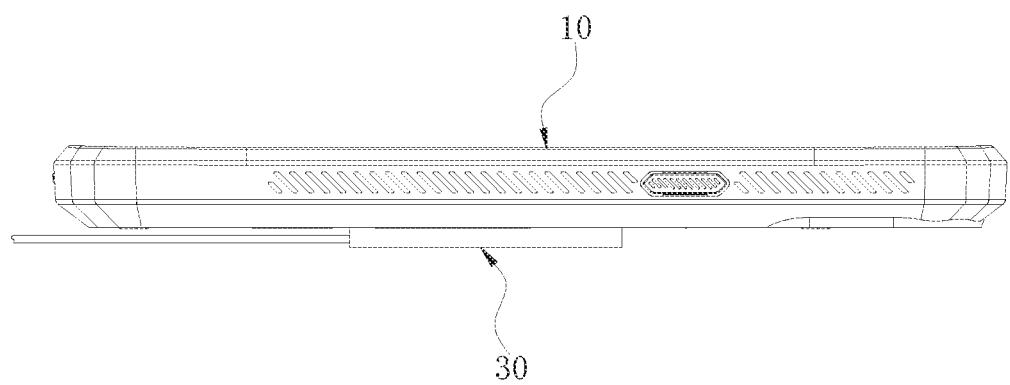
FIG. 7 is a schematic view showing a mobile phone covered with the mobile phone protective housing shown in FIG. 6 is being wirelessly charged.

Particularly, the stand 300 may have a ring shape, and the first groove 121 is an annular groove corresponding to the stand 300. In this way, when the stand 300 is rotatably folded, the stand 300 can be entirely accommodated in the first groove 121. With reference to FIG. 1 and FIG. 6, in this embodiment, the stand 300 is of a ring shape, and the first groove 121 is of a ring shape accordingly. Preferably, in a folded state, a back surface of the stand 300 is flush with the back surface of the bottom wall 101. Alternatively, the back surface of the stand 300 may be slightly higher or lower than the back surface of the bottom wall 101. As shown in FIG. 6 and FIG. 7, when the stand 300 is folded, the stand 300 may be hidden in the housing body 100 without protruding out from the housing body 100. In this way, the mobile phone covered with the mobile phone protective cover 10 may be wirelessly charged more stably with high charging efficiency.

In this embodiment, with reference to FIG. 1, the back surface of the bottom wall 101 of the housing body 100 is preferably provided with a circular boss 124, and the first groove 121 surrounds the boss 124. Particularly, with reference to FIG. 1 and FIG. 9, the housing body 100 includes a middle frame 110 and a face plate 120 that are connected integrally. The shape of the middle frame 110 defines an overall shape of the housing body, and the middle frame 110 is wrapped around the periphery of the mobile phone. The middle frame 110 includes a bottom plate and a side wall. The face plate 120 is a flat plate, which is connected to the bottom plate of the middle frame 110, and forms the bottom wall 101 together with the bottom plate. The face plate 120 is preferably made of a relatively hard material to provide a good support for the back surface of the mobile phone during use. The middle frame 110 is made of a softer material and has good elasticity. The middle frame is wrapped around the periphery of the mobile phone to provide a fitting wrapping effect, which prevents the protecting effect from being affected due to assembling clearance caused by dimensional tolerances.

The back surface of the face plate 120 is provided with the boss 124, and the back surface of the face plate 120 around the boss 124 is recessed to form the first groove 121.

The housing body 100 of this embodiment further includes a front frame 130 for snap connection with the middle frame 110. The front frame 130 includes a hollow frame body and a protecting film 131 connected to an inner peripheral edge of the frame body. The protecting film 131 is configured to provide waterproof and scratch-resistant protection functions for a screen of the mobile phone. The frame body is connected with the peripheral edge of the protecting film 131. The frame body of the front frame 130 and the middle frame 110 are engaged and fixed together.

Figure 8:
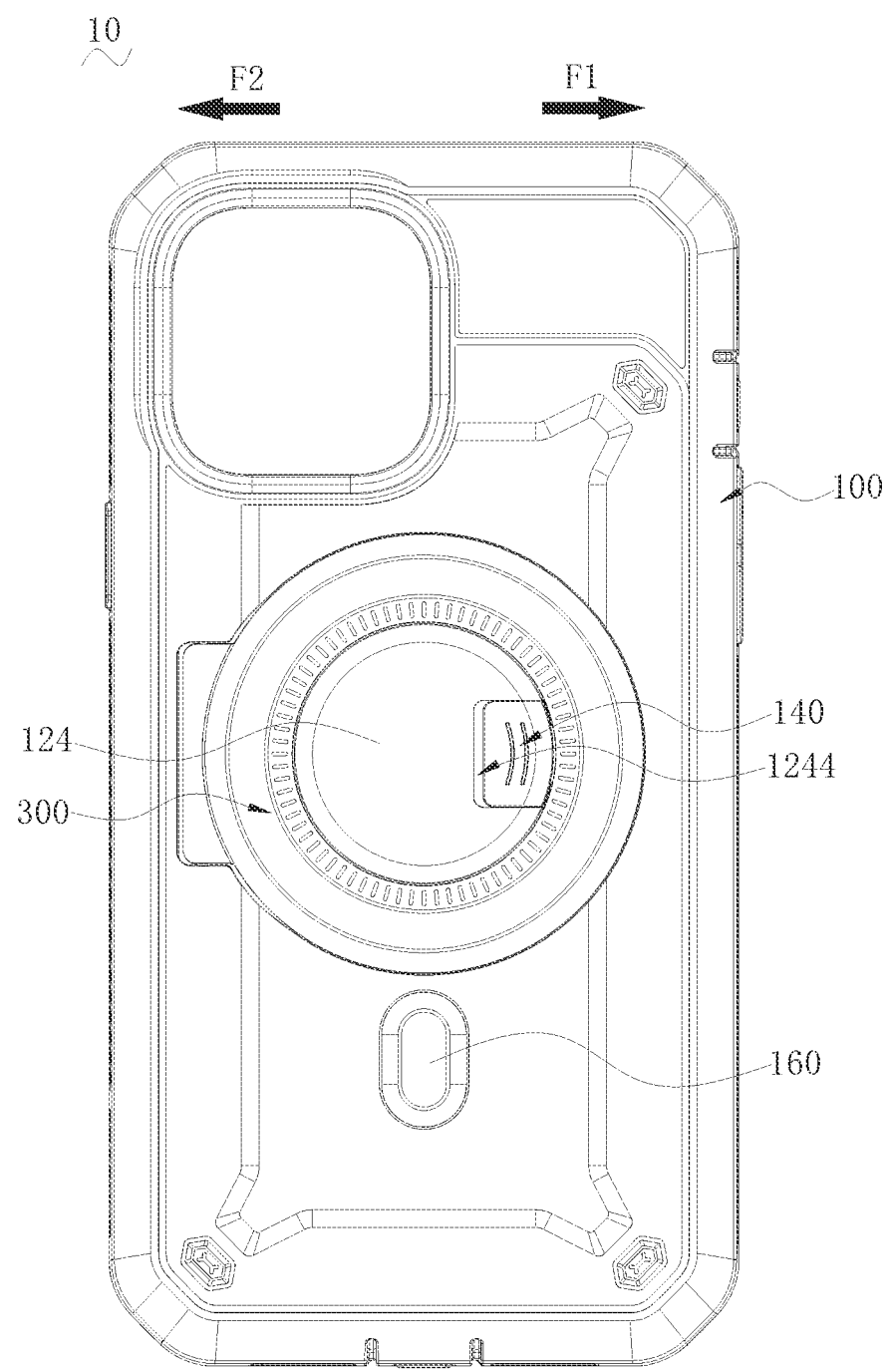
FIG. 8 is a rear view of the mobile phone protective housing shown in FIG. 6.
Figure 9:
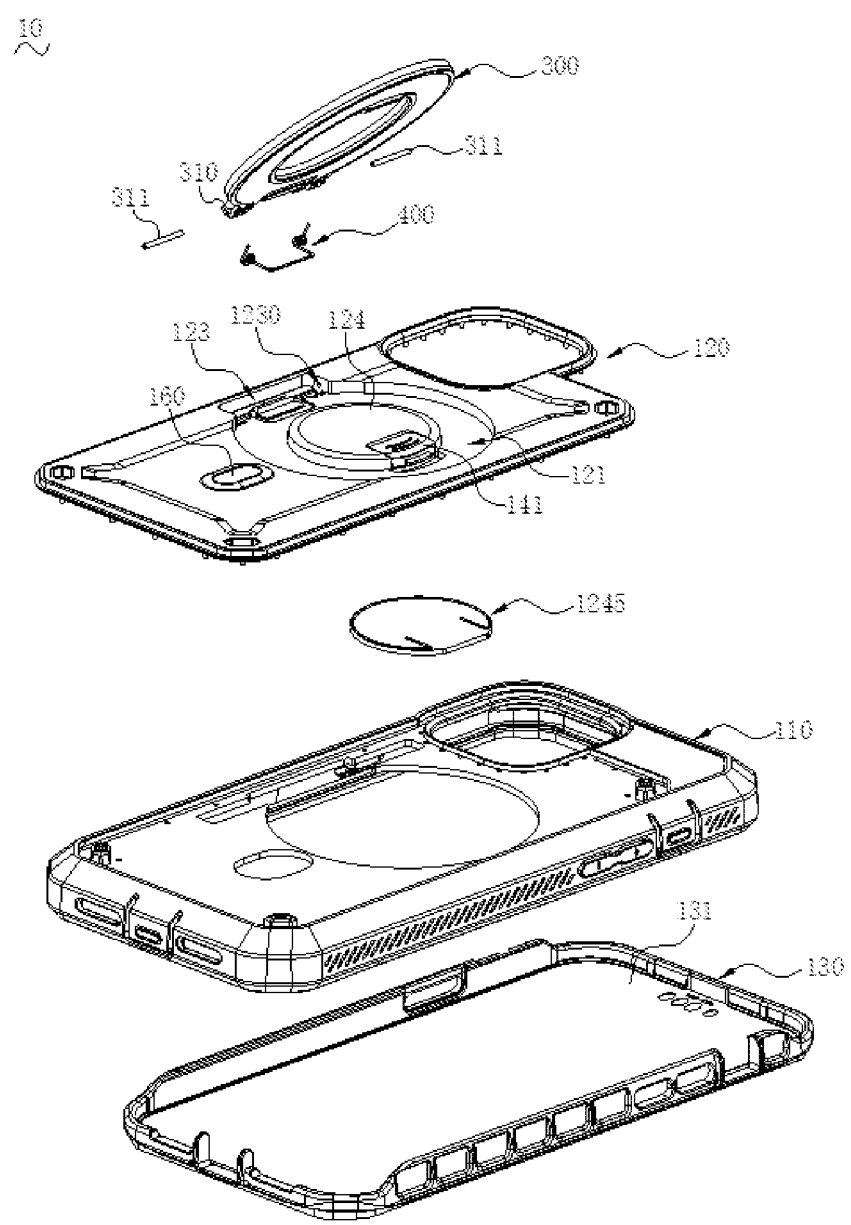
FIG. 9 is an exploded view of the mobile phone protective housing shown in FIG. 1.
Figure 10:
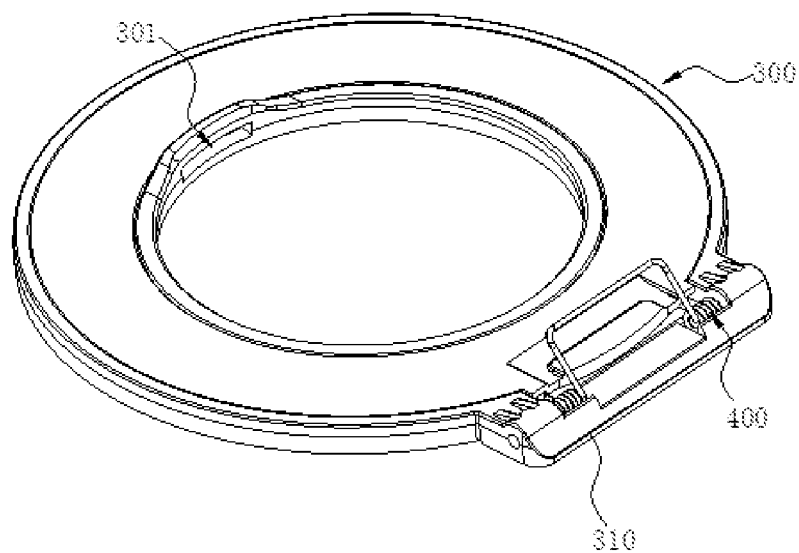
FIG. 10 is a schematic structural view of the stand of the mobile phone protective housing shown in FIG. 9.

With reference to FIG. 8 to FIG. 10, in this embodiment, preferably, a locking structure 140 is provided between the boss 124 and the stand 300. The locking structure 140 includes a locking member 141 and a locking groove 301. The locking member 141 is movably disposed on the boss 124. The locking groove 301 is defined in an inner side wall of the stand 300. The locking member 141 is movable between a locking position and an unlocking position. The locking member 141 can be engaged in or released from the locking groove 301 to lock or release the stand 300. When the stand 300 is folded in the first groove 121 and the locking member 141 is engaged in the locking groove 301, the stand 300 is in a lock state. When the locking member 141 is released from the locking groove 301, the stand 300 can be rotated and unfolded.

When the locking member 141 is in the locking position, the locking member 141 is engaged in the locking groove 301 to lock the stand 300. At this time, the stand 300 is in the locked state, and the stand 300 is folded and retained in the first groove 121. In the locking state, the stand 300 cannot be unfolded without applying an external force to the locking member 141 to release it. When the locking member 141 is in the unlocked position, the locking member 141 is disengaged from the locking groove 301 to unlock the stand 300. In this state, the stand 300 is in the unlocked state, that is, the stand 300 is in a rotatably unfolded state.

Figure 12:
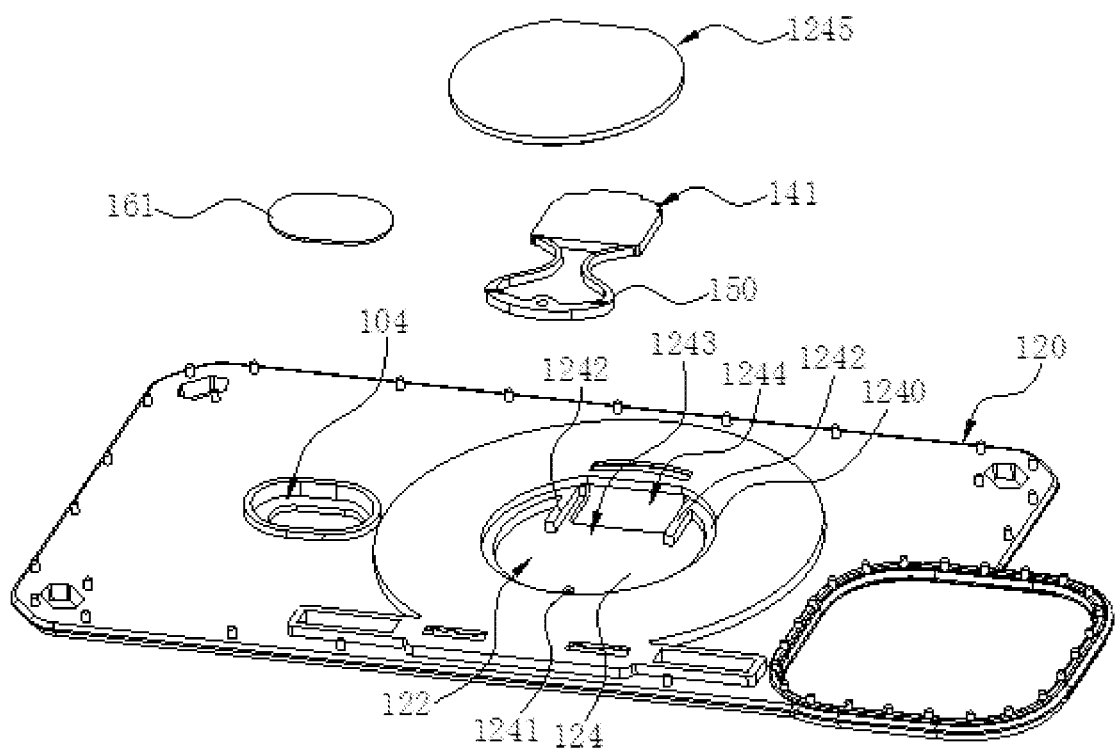
FIG. 12 is a partial exploded schematic view of the mobile phone protective housing as shown in FIG. 9.

Particularly, in this embodiment, with reference to FIG. 9, FIG. 10 and FIG. 12, a front surface of the face plate is recessed and forms a second groove 122, and the second groove 122 is corresponding to the boss 124 in position. The locking member 141 is a sliding block slidably disposed within the second groove 122. The boss 124 is provided with a through hole 1244 at its one side, through which at least one part of the sliding block can be exposed to facilitate the operation of the sliding block. The sliding block is slidably connected with the boss 124, and the sliding block is capable of sliding relative to the boss 124.

Figure 13:
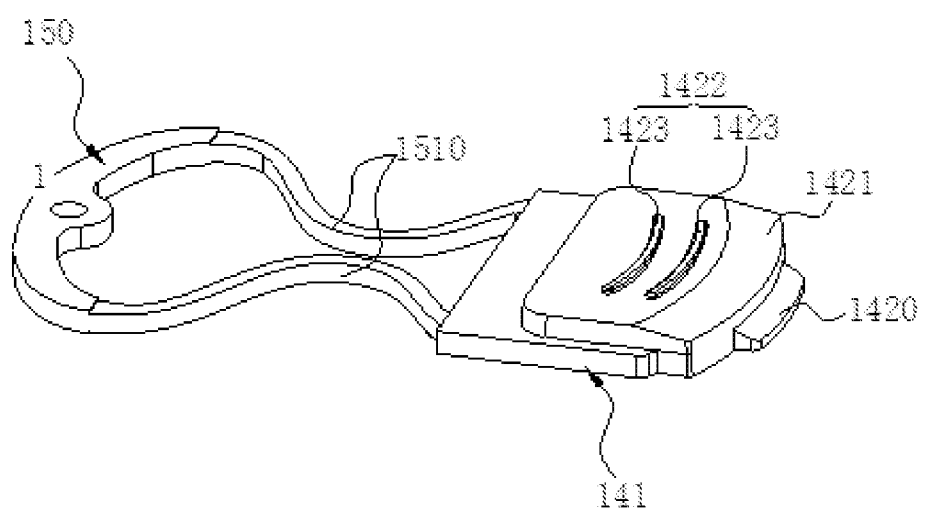
FIG. 13 is a schematic structural view of a sliding block of the mobile phone protective housing shown in FIG. 12.
Figure 14:
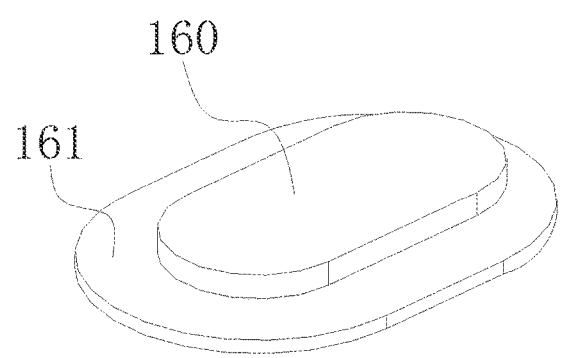
FIG. 14 is a perspective view of a positioning magnet of the mobile phone protective housing.
Figure 15:
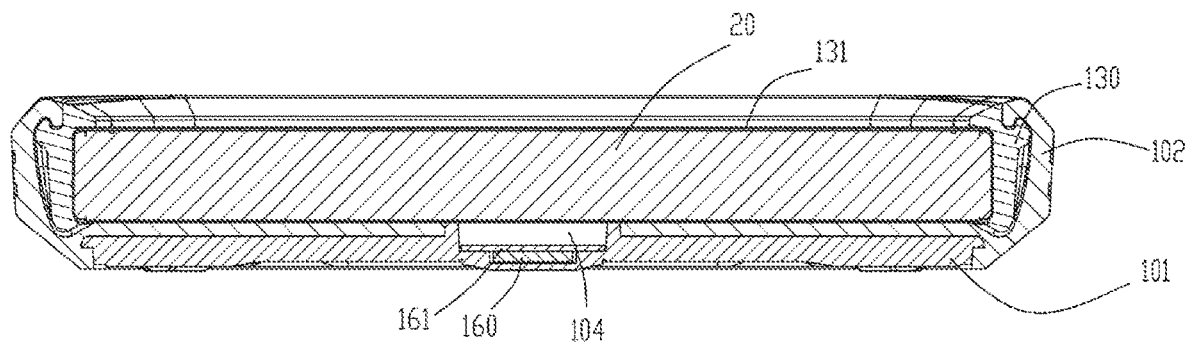
FIG. 15 is a cross section of the mobile phone protective housing.

With reference to FIG. 8, FIG. 9 and FIG. 13, one side of the sliding block which expose from the boss is provided with a locking protrusion 1420. The locking protrusion 1420 extends towards the locking groove. When the sliding block is slid to the locked position in a direction F1 in FIG. 8, the locking protrusion 1420 is engaged into the locking groove 301. At this time, the stand 300 is in the locked state, and the stand 300 is folded and maintained in the first groove 121. When the sliding block is slid to the unlocked position in a direction F2 in FIG. 8, the locking protrusion 1420 is disengaged from the locking groove 301. At this time, the stand 300 is in the unlocked state, that is, the stand 300 can be rotated and unfolded state. The directions F1 and F2 in FIG. 8 are both parallel to a width direction of the housing body 100.

With reference to FIG. 8 to FIG. 10 and FIG. 13, a first elastic member 400 is provided between the stand 300 and the housing body 100. The first elastic member 400 is configured to bias onto the stand 300, that is, provide a force onto the stand 300 when the stand 300 is in the folded state, such that when the sliding block is slid to the unlocked position, the stand 300 automatically rotates under the action of an elastic force of the first elastic member and rotates to a preset angle. That is, when the sliding block is slid to the unlocked position, the stand 300 may automatically lifts by means of the first elastic member 400 without a manual force. At this time, the stand 300 is unfolded to a preset angle. By providing the first elastic member, the user does not need to manually rotate the stand 300 to unfold the stand 300, and thus it is convenient to use.

Preferably, an outer side wall of the locking protrusion 1420 of the sliding block is curved. Two sides of the locking protrusion 1420, which are away from and close to the front surface of the housing body 100 respectively, each have an inclined surface. One side of the locking groove 301, which is close to the back surface of the bottom wall 101, has an inclined surface. In this way, the friction between the stand 300 and the housing body 100 and the sliding block can be reduced, which facilitates rotating, unfolding and folding the stand 300.

With reference to FIG. 9 and FIG. 10, one side of the stand 300 is provided with a mounting portion 310, the back surface of the bottom wall 101 of the housing body 100 is provided with a third groove 123 for accommodating the mounting portion 310, the third groove 123 is communicated with the first groove 121. The mounting portion 310 is rotatably connected with the housing body 100 through at least one rotating shaft 311 in a damping fashion, and the user may freely rotate the mobile phone to a desired angle according to his or her own needs, which is convenient to use.

Meanwhile, particularly, with reference to FIG. 12, the third groove 123 is provided in the back surface of the face plate 120, the through hole 1244 of the boss 124 is located in one side of the boss 124 away from the third groove 123, and the locking protrusion 1420 is disposed on one side of the sliding block which is away from the third groove 123. Two opposite side walls of the third groove 123 are respectively provided with a mounting hole 1230, two rotating shafts 311 are provided, one end of each rotating shafts 311 is inserted in a respective mounting hole 1230, and the rotating shafts 311 are in interference fit with the mounting holes 1230. The other end of each rotating shaft 311 is inserted in a respective side of the mounting portion 310 and is connected and fixed with the mounting portion 310. In this way, the stand 300 is pivotally connected with the face plate 120 through the rotating shafts 311 on the mounting portion 310, and the stand 300 can be rotatably unfolded to proper angles, such that the mobile phone protective housing 10 can be placed on the desk at a desired angle. In a process of unfolding the stand 300, the mounting portion 310 rotates together with the stand 300.

The mounting portion 310 and the stand 300 may be integrally molded, or separated formed and assembled together by a connecting member or snap-fitting. The back surface of the mounting portion 310 is flush with the back surface of the stand 300. As such, when the stand 300 is rotated to be folded, the back surface of the mobile phone protective housing 10 is substantially flat, which further ensures a high efficiency of the mobile phone during wireless charging.

Figure 11:
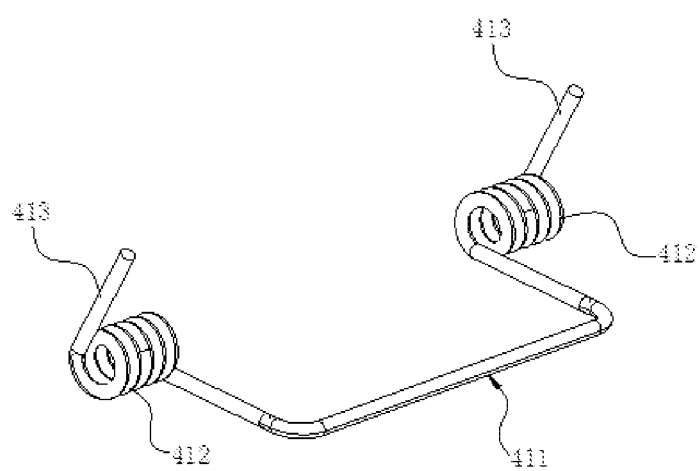
FIG. 11 is a schematic structural view of a spring of the stand shown in FIG. 10.

With reference to FIG. 9 to FIG. 11, the first elastic member 400 is a torsion spring, and the torsion spring is positioned between the mounting portion 310 and the face plate 120. The torsion spring includes a bar 411, two cylindrical spiral springs 412 and two legs 413. Preferably, the bar 411, the springs 412 and the legs 413 are integrally formed. In this embodiment, the bar 411 is U-shaped, and the two springs 412 and the two legs 413 are symmetrically arranged with respect to the bar 411, that is, one end of each spring 412 is connected to a respective side of the bar 411, and the legs 413 extend out from the other ends of the springs 412.

Referring also to FIG. 5, the mounting portion 310 is provided with an accommodating groove 312 for the springs 412, and the two springs 412 are positioned in the accommodating groove 312. The two rotating shafts 311 are rotatably connected with the housing body 100 through the springs 412 and the mounting portions 310 in a damping fashion. One of the legs 413 and the bar 411 abuts against the bottom of the first groove 121, and the other one of the legs 413 and the bar 411 abuts against the stand 300 or is embedded in the stand 300. When the sliding block is in the locked state, the torsion spring is compressed, and has a pre-pressure onto the stand 300, and thus provides a driving force for automatically rotating the stand 300. When the sliding block is slid to the unlocked position, the compressed torsion spring recovers and rotates the stand 300 to a preset angle. At this time, the stand 300 can be further rotated to a larger angle by applying a force. In this embodiment, the legs 413 on two sides of the torsion spring abut against the bottom of the first groove 121, that is, abut against the housing body 100, and the bar 411 abuts against an inner side surface of the stand 300 facing the housing body 100.

In this embodiment, with reference to FIG. 8 to FIG. 10, FIG. 12, and FIG. 13, a second elastic member 150 is arranged in the second groove 122. The second elastic member 150 bias the sliding block towards the locked position. When the stand 300 is folded, the elastic force of the second elastic member 150 drives the sliding block to move towards the locked position, such that the locking protrusion 1420 on the sliding block is automatically engaged into and maintained in the locking groove 301 to lock the stand 300 without manually moving the sliding block.

Particularly, the second elastic member 150 is a plastic member. The plastic member and the sliding block may be integrally formed. Alternatively, the second elastic member 150 and the sliding block may be separately formed. The second elastic member 150 is made of plastic rather than metal, which may avoid the influence of a metal member on the wireless charging due to magnetic attraction. The second elastic member 150 preferably has a Ω shape, an opening end of the second elastic member 150 is connected with the sliding block, and the other end of the plastic member is fixed in the second groove 122. The second elastic member 150 has a deforming portion 1510 bent towards the middle. When the sliding block is slid, the deforming portion 1510 is compressed to deform. When an external force is released, the deforming portion 1510 recovers and pushes the sliding block to the locked position. The plastic member is not limited to Ω shape, and the plastic member may be of other shapes that may provide a driving force for sliding the sliding block, such as an oval shape.

It should be understood that the second elastic member 150 may be a spring, wherein one end of the spring may be connected and fixed on a wall of the second groove 122, and the other end of the spring may be connected and fixed with the sliding block. The second elastic member 150 may be a leaf spring, that is, a leaf spring may be used to provide a driving force for the sliding block.

Preferably, two protruding bars 1242 which are spaced from each other are provided in the second groove 122. The two protruding bars 1242 are symmetrically arranged on two sides of the sliding block, that is, the two protruding bars 1242 are arranged on two sides of the sliding block in parallel. The protruding bars 1242 and the back surface of the boss 124 cooperatively define a guiding groove 1243. The sliding block is capable of sliding back and forth in the guiding groove 1243. That is, the sliding block is slidably connected with the boss 124 by the protruding bars 1242 on two sides. The guiding groove 1243 is formed in second groove 122, such that the sliding block is capable of sliding in a predetermined direction (the directions F1 and F2 in FIG. 8) under the guidance of the guiding groove 1243.

Particularly, the back surface of the sliding block is provided with a limiting block 1421. The back surface of the limiting block 1421 is flush with or lower than the back surface of the front frame 120. When the sliding block slides to a preset position in a direction away from the locking groove 301, the limiting block 1421 abuts against the boss 124, and the sliding block can be prevented from entirely sliding into the second groove 122 by providing the limiting block 1421. Therefore, when the limiting block 1421 slides in a direction towards the third groove 123 upon an external force until the limiting block 1421 abuts against the boss 124, the stand 300 can be released from the first groove 121 and rotatably unfolded.

Preferably, an inner periphery of the second groove 122 is provided with an annular flange 1240. A cover 1245 is mounted to the second groove 122 by the annular flange 1240. A peripheral edge of the cover 1245 abuts against the annular flange 1240, and the cover 1245 covers the second groove 122, such that the sliding block and the second elastic member 150 are retained within the second groove 122. The peripheral edge of the cover 1245 may be fixed on the annular flange 1240 by bonding or snap-fitting. A front surface of the cover 1245 is flush with a front surface of the bottom wall 101. A bottom wall of the second groove 122 is provided with a connecting column 1241. The second elastic member 150 is mounted around the connecting column 1241, preferably by interference fit. Particularly, one end of the second elastic member 150, which is away from the sliding block, is fixed in the second groove 122 by the connecting column 1241. In this way, the second elastic member 150 is fixed in the second groove 122 and is capable of deforming therein to provide a driving force for the sliding block.

Preferably, the back surface of the limiting block 1421 is provided with an anti-sliding structure 1422, and the anti-sliding structure 1422 may be one or more of at least one protrusion, at least one stripe or at least one anti-sliding groove. The anti-sliding structure 1422 is formed on the limiting block 1421 to increase a friction force between the limiting block 1421 and the finger of an operator, so as to facilitate a sliding operation of the sliding block. As such, only a small force applied to a surface of the limiting block 1421 can push the sliding block and thus unlock the stand 300, such that the stand 300 can be rotatably unfolded from the first groove 121. In one embodiment, the anti-sliding structure 1422 includes two ribs 1423 arranged in parallel on the back surface of the limiting block 1421. The ribs 1423 are arc-shaped, which are centered on a point coincide with the center of the boss 124.

With reference to FIG. 1, FIG. 12 and FIGS. 14 to 15, the bottom wall 101 of the housing body 100 is provided with a positioning magnet 160. Particularly, the face plate 120 is provided with a mounting groove 104 at one end close to a data cable plug via. The mounting groove 104 is a stepped groove having an upper opening and a lower hole, which are communicated with each other. The upper opening has a larger size than that of the lower hole, so that a step surface is formed between the upper opening and the lower hole. The positioning magnet 160 is fixed in the mounting groove 104. Particularly, the positioning magnet 160 is fixed on a plastic base 161. Preferably, an outline of the plastic base 161 is similar to that of the positioning magnet 160. In this embodiment, the plastic base 161 and the positioning magnet 160 both have a substantially elliptical shape. An outer dimension of the plastic base 161 is larger than that of the positioning magnet 160. A peripheral edge of the plastic base 161 surrounding the positioning magnet 160 is supported by and fixed on the step surface, with the positioning magnet 160 protruding into the lower hole. In this way, the positioning magnet 160 is fixed in the mounting groove 104.

When the mobile phone protective housing 10 is placed on a wireless charging device, the positioning magnet 160 attracts a positioning magnet in the wireless charging device, and the magnetic member 200 within the stand 300 is absorbed to the wireless charging apparatus in a proper position, which ensures correct positioning of the mobile phone protective housing 10 relative to the wireless charging apparatus in a wireless charging process. The positioning magnet 160 may be a magnet or a ferromagnetic substance.

The above descriptions are only preferred embodiments of the present disclosure and are not intended to limit the present disclosure. Any modification, equivalent replacement and improvement made within the spirit and the principle of the present disclosure shall be included within the protection scope of the present disclosure.

What is claimed is:

1. A mobile phone protective housing, comprising:
  a housing body, comprising a bottom wall and a side wall extending from a circumference of the bottom wall, and the side wall and the bottom wall defining an accommodating chamber for accommodating a mobile phone; and
  a stand, which is rotatably connected to a back surface of the bottom wall, wherein the stand is foldable and unfoldable relative to the housing body, and wherein the stand comprises a magnetic member;
  wherein a back surface of the bottom wall is provided with a first groove for receiving the stand when the stand is folded;
  wherein the back surface of the bottom wall is provided with a circular boss, and the first groove surrounds the boss; and
  wherein a locking structure is provided between the boss and the stand, the locking structure comprises a locking member movably mounted on the boss and a locking groove disposed in a side wall of the stand, the locking member is movable between a locking position and an unlocking position; when the locking member is in the locking position, the locking member is engaged in the locking groove to lock the stand; and when the locking member is in the unlocking position, the locking member is disengaged from the locking groove to release the stand.

2. The mobile phone protective housing according to claim 1, wherein the stand is annular, the first groove is an annular groove; and when the stand is rotatably accommodated in the first groove, a back surface of the stand is substantially flush with a back surface of the bottom wall.

3. The mobile phone protective housing according to claim 1, wherein a front surface of the bottom wall at a position corresponding to the boss is recessed to form a second groove, the locking member is a sliding block slidably received in the second groove, a back surface of the boss is provided with a through hole for exposing the sliding block, one side of the sliding block is provided with a locking protrusion; when the sliding block is slid to the locking position, the locking protrusion is engaged into the locking groove; and when the sliding block is slid to the unlocking position, the locking protrusion is disengaged from the locking groove.

4. The mobile phone protective housing according to claim 3, wherein a first elastic member is provided between the stand and the housing, and the first elastic member is configured to bias the stand, such that when the sliding block is slid to the unlocking position, the stand automatically rotates under an action of the first elastic member to a preset angle.

5. The mobile phone protective housing according to claim 4, wherein one side of the stand is provided with a mounting portion, the back surface of the bottom wall is provided with a third groove corresponding to the mounting portion, the third groove is communicated with the first groove, and the mounting portion is rotatably connected with the housing at the third groove by means of rotating shafts.

6. The mobile phone protective housing according to claim 5, wherein the mounting portion is provided with an accommodating groove; the first elastic member is a torsion spring, and the torsion spring comprises a bar, two springs and two legs which are integrally formed; the bar is U-shaped; the two springs are of a cylindrical spiral shape, one end of each spring is connected to a respective side of the bar, and the legs extend out from the other ends of the springs, the two spring are positioned in the accommodating groove, one of the legs and the bar abuts against the bottom of the first groove, and the other one of the legs and the bar abuts against the stand.

7. The mobile phone protective housing according to claim 3, wherein a second elastic member is arranged in the second groove, and the second elastic member biases the sliding block towards the locking position.

8. The mobile phone protective housing according to claim 7, wherein the second elastic member is a plastic member.

9. The mobile phone protective housing according to claim 8, wherein the second elastic member is formed integrally with the sliding block.

10. The mobile phone protective housing according to claim 8, wherein an inner periphery of the second groove is provided with an annular flange, the back surface of the bottom wall is provided with a cover covering the second groove, a peripheral edge of the cover abuts against the annular flange.

11. The mobile phone protective housing according to claim 10, wherein a bottom wall of the second groove is provided with a connecting column, the second elastic member is mounted around the connecting column, and the second elastic member is fixed in the second groove through the connecting column.

12. The mobile phone protective housing according to claim 3, wherein two protruding bars which are spaced from each other are provided in the second groove, the two protruding bars are symmetrically arranged on two sides of the sliding block, and cooperatively define a guiding groove together with a surface of the boss, and the sliding block is slidable back and forth in the guiding groove.

13. The mobile phone protective housing according to claim 12, wherein a back surface of the sliding block is provided with a limiting block, and when the sliding block is slid to the unlocking position, the limiting block abuts against the boss.

14. The mobile phone protective housing according to claim 13, wherein the back surface of the limiting block is provided with an anti-sliding structure.

15. The mobile phone protective housing according to claim 1, wherein the magnetic member comprises a plurality of magnets annularly disposed within the stand at intervals.

16. The mobile phone protective housing according to claim 1, further comprising a positioning magnet, and the positioning magnet is mounted on the bottom wall.

17. The mobile phone protective housing according to claim 16, further comprising a plastic base on which the positioning magnet is mounted, wherein the bottom wall defines a mounting groove, the mounting groove is a stepped groove having a step surface, the plastic base and the positioning magnet is mounted in the mounting groove with a periphery portion of the plastic base being supported by and fixed on the step surface.

\* \* \* \* \*